Figures 1, 2, 3, 4, 5:
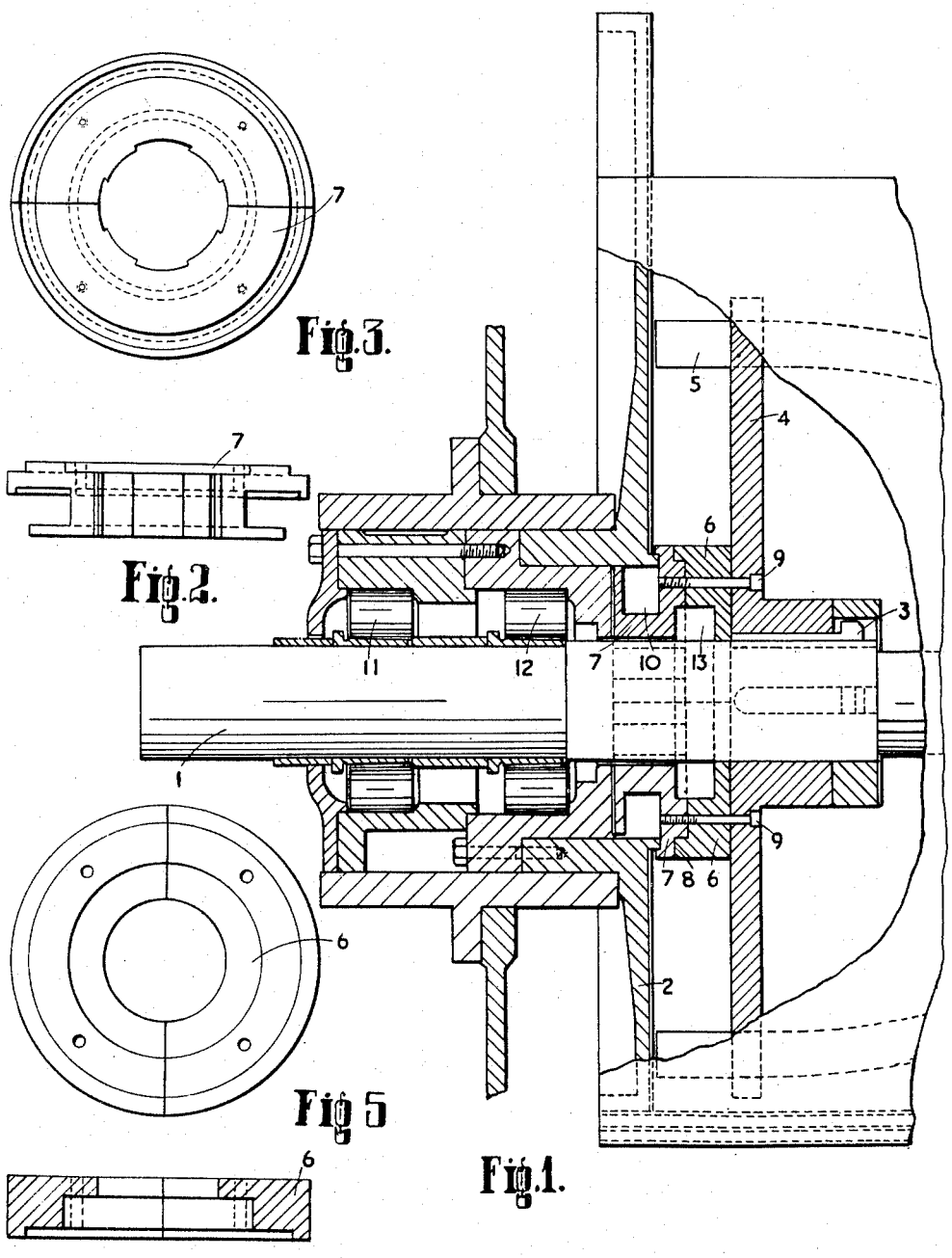

Inventor
JOSEPH FRANCIS NAYLOR

Patented Dec. 30, 1952

2,623,764

UNITED STATES PATENT OFFICE 2,623,764

SEALING GLAND FOR ROTARY SHAFTS

Joseph Francis Naylor, Newton-le-Willows, England, assignor to T. & T. Vicars Limited, Earlestown, England, a British company Application January 28, 1949, Serial No. 73,273
In England July 5, 1948

1 Claim. (Cl. 286—10)

The present invention relates to an improved sealing gland for the rotary shaft of a machine.

Whilst the invention has a particular scope of utility as applied to the shafts of the beater arms of dough mixing machines, it is also generally applicable.

An object of the present invention is to provide a seal restricting the inflow of lubricant into a machine and the outflow of powder or plastic material under treatment in the machine.

According to the present invention a gland element is mounted on the rotary shaft between an element such as a beater carried by the shaft and the boss on the machine frame carrying the bearings for the said shaft, which bland element has two peripheral annular pockets, one extending inwardly towards the shaft to collect lubricant which may leak past the sealing means for the bearings, and the other extending outwardly from the shaft adapted to collect dust, flour or the like material which may leak into it from within the casing into which the rotary shaft projects.

The invention is further described with reference to the accompanying drawings showing the application of the invention, by way of example, to a horizontal dough mixing machine.

In the drawings:

Fig. 1 is a part sectional elevation through one bearing of a dough mixing machine, Fig. 2 is a sectional plan view through one gland part, Fig. 3 is a corresponding outside end elevation, Fig. 4 is a sectional plan view of the other gland part, Fig. 5 is an outside elevation corresponding to Fig. 4.

In the dough mixing machine illustrated by way of example, a driving shaft 1 projects into a casing 2 open at the top to receive dough or the like material to be mixed and is connected by keys 3 to spiders 4 carrying the usual dough mixing blades 5.

According to the present invention, between the outer face of the spider 4 and the inner face of the casing 2 there is disposed a packing gland consisting of two sealing rings 6, 7. These two sealing rings 6, 7 have mutually rabbeted radial faces 8 and are connected together and to the spider discs 4 by detachable bolts 9. The gland part 7 has a peripheral groove or recess 10 extending radially outwardly, which serves to collect any powder or plastic material being mixed within the casing 2 and prevent its escape towards the bearings 11, 12, for the shaft 1.

The assembled gland parts 6, 7, also present an internal radially disposed recess 13 serving to trap lubricant from the bearings 11, 12, and prevent this passing along into the casing 2 to contaminate the products being treated therein.

The gland parts 6 and 7 are each split into two halves thus facilitating their removal from the working position for the purpose of clearing away any residue which has collected in the recesses 10 and 13. When assembled the planes on which parts 6 and 7 are split will normally be disposed at right angles to each other.

It will be appreciated that the gland parts 6, 7 may be additional to normal felt or other packing glands on the shaft 1.

Leakage of material from inside the casing 2 into the groove 10 and leakage of lubricant from the bearings 11, 12 into the groove 13 will be slow, but eventually, of course, one or other of these grooves becomes filled, when it becomes an easy matter to dismantle the gland consisting of the grooved rings 6, 7, by detaching these from the spider 4, then cleaning out the groove and replacing them.

I claim:

A sealing device for a shaft in a casing, including in combination a sealing ring having an open peripheral groove facing inwardly, a second sealing ring having an open peripheral groove facing outwardly, and means to connect said rings together and to the shaft in parallel disposition while leaving a space of small clearance between the inwardly extending groove and the shaft and between the outwardly extending groove and the interior of the casing.

JOSEPH FRANCIS NAYLOR.

REFERENCES CITED

The following references are of record in the file of this patent:

UNITED STATES PATENTS

| Number | Name | Date |
|---|---|---|
| 1,651,855 | Warren | Dec. 6, 1927 |
| 1,780,764 | Noble | Nov. 4, 1930 |
| 2,524,124 | Gyana | Oct. 3, 1950 |

FOREIGN PATENTS

| Number | Country | Date |
|---|---|---|
| 470,121 | Germany | of 1929 |